United States Patent Office.

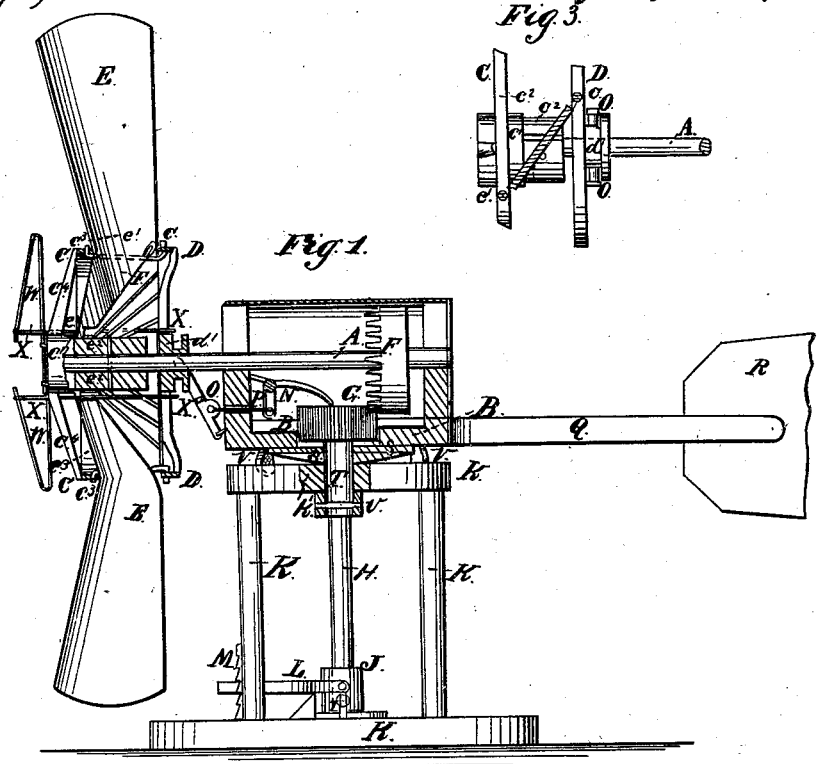
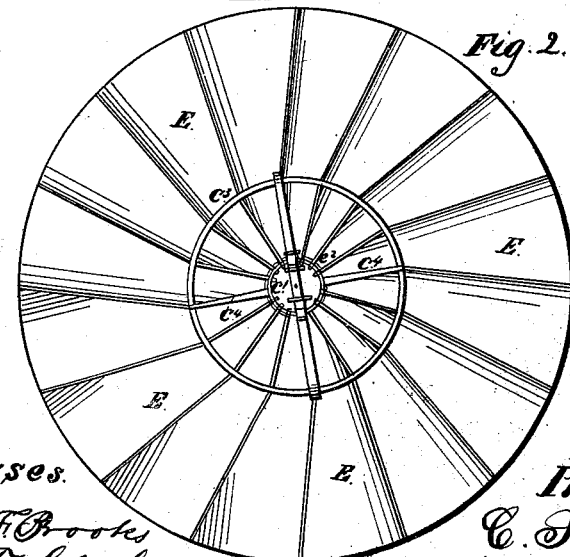

C. S. JENKINS, OF LANDSDALE, PENNSYLVANIA.

Letters Patent No. 93,446, dated August 10, 1869.

IMPROVEMENT IN WINDMILLS.

The Schedule referred to in these Letters Patent and making part of the same.

*To all whom it may concern:*

Be it known that I, C. S. JENKINS, of Landsdale, in the county of Montgomery, and State of Pennsylvania, have invented a new and useful Improvement in Windmills; and I do hereby declare that the following is a full, clear, and exact description thereof, which will enable others skilled in the art to make and use the same, reference being had to the accompanying drawing, forming part of this specification, in which—

Figure 1 is a vertical section of my improved windmill.

Figure 2 is a front view of the wheel, when adjusted to receive the full force of the wind.

Figure 3 is a detail side view of the hub and wheels, to which the fans or arms of the wheel are attached.

My invention has for its object to improve the construction of windmills, so as to make them more convenient in use, more effective in operation, and more under the control of the operator, than when constructed in the ordinary manner; and It consists in the construction and combination of various parts of the machine, as hereinafter more fully described.

A is a horizontal shaft, which revolves in bearings attached to the bed-plate B.

To the outer end of the shaft A is rigidly attached the hub $c^1 c^2$ of the wheel C, the rim $c^3$ of which is securely attached to the spokes $c^4$, four, more or less, of which should be used.

D is a wheel, similar in construction to the wheel C, except that it may be made lighter, and the hub $d$ of which works loosely upon the shaft A, so that it may slide longitudinally, and at the same time revolve or partially revolve upon said shaft A.

E are the four arms or wings, to which are attached bars or irons, $e$, the ends of which are bent upward, or have upwardly-projecting pivots formed upon or attached to them, which pass through holes in the rims $c^3 d^2$ of the wheels C and D, in such a way that the wings E may be set parallel with or inclined to the shaft A, by simply moving the wheel D toward or from the wheel C, which said movement of the wheel D causes it to revolve slightly upon the shaft A.

To the lower ends of the wings E are attached, or upon them are formed pivots $e^2$, which enter the hub $c^1 c^2$ of the wheel C, and support the wings in such a way that the pivots $e^1$ cannot drop out of the wheels C D, while at the same time the said wings may be turned freely, to adjust them in the desired position.

The hub of the wheel C is made in two parts, $c^1 c^2$, the part $c^1$ being permanently attached to the shaft, and being recessed upon its inner end, to receive the end of the other part, $c^2$, which moves upon the shaft A, and is secured in place, when moved close up to the part $c^1$, by a pin or bolt, passing through the said part $c^2$ and through the shaft A, as shown in figs. 1 and 3.

The part $c^2$ is also grooved longitudinally upon one side, as shown in fig. 3, so that by removing the said key, and the pin or bolt by which the part $c^2$ is secured to the shaft A, the said part $c^2$ of the hub C may be turned, so that the pivot of any desired wing may drop down into said groove, allowing the said wing to be conveniently removed for repairs or other desired purpose.

To the shaft A is attached a crown-wheel, F, the teeth of which mesh into the teeth of the long gear or pinion-wheel G, attached to the upper end of the vertical driving-shaft H, the lower end of which rests and revolves in a step, I, placed in the socket J, attached to the base of the supporting frame-work K.

The step I is hung from the ends of the forked lever L, which is pivoted to some suitable support, and the free end of which extends out along a ratchet-bar, M, attached to a post of the frame K, or to some other suitable support, so that, by means of the lever L, the shaft H may be raised and lowered, and held in any desired position.

N is a two-armed lever or shaft, which is pivoted to some suitable support, attached to or connected with the bed-plate B.

The end of one arm of the lever or shaft N rests upon the upper end of the shaft H or gear-wheel G. The end of the other arm of the lever or shaft N is connected with the lever O by the connecting-rod P.

One end of the lever O is pivoted to the bed-plate B, and its other end is forked, and rides upon the grooved end of the hub of the wheel D, so that the said wheel may be moved to set the wings E, by simply raising or lowering the shaft H.

To the side of the bed-plate B, opposite to the rings E, is attached an arm, Q, having a vane, R, attached to its outer end, so as to always hold the fans or wings E toward the wind.

To the under side of the bed-plate B is securely attached a plate, S, having a tube or socket, T, securely attached to it, through which the shaft H passes, and which projects downward through the platform $k'$ of the frame-work K, upon which the bed B rests.

To the lower end of the socket T is attached a wing, U, to connect the bed-plate B and its attachments securely to the platform $k'$.

The bed-plate B rests upon friction-wheels V, pivoted to supports attached to the platform $k'$, to diminish friction, and enable the bed-plate B to be more readily turned by the vane R.

To the forward end of the hub $c'$ or of the shaft A are attached one or more springs, W, the ends of which are connected with the wheel D by the connecting-rods X, so as to hold the said wheel D forward, and give steadiness to it, in whatever position it may be adjusted.

Having thus described my invention,

What I claim as new, and desire to secure by Letters Patent, is—

1. The wind-wheel, formed by the combination of the wheels C D and wings E, with each other and with the shaft A, substantially as herein shown and described, and for the purpose set forth.

2. The hub $c^1$ $c^2$ of the wheel C, formed in two parts, substantially as herein shown and described, and for the purpose set forth.

3. Detachably-pivoted wings E, to the hub $c^1$ $c^2$ and to the rims $c^3$ $d^2$ of the wheels C D, substantially as herein shown and described, and for the purpose set forth.

4. The combination of the two-armed lever or shaft N, connecting-rod P, and forked lever O, with each other and with the vertical shaft H and hub $d^1$ of the wheel D, substantially as herein shown and described, and for the purpose set forth.

C. S. JENKINS.

Witnesses:
 A. C. GODSHALL,
 O. M. EVANS.